United States Patent
Baumann

[19]

[11] Patent Number: 5,916,324
[45] Date of Patent: Jun. 29, 1999

[54] STEPPING GEAR MECHANISM

[75] Inventor: Ulrich Baumann, Lenningen, Germany

[73] Assignee: Traub Drehmaschinen GmbH, Germany

[21] Appl. No.: 08/983,222

[22] PCT Filed: May 7, 1997

[86] PCT No.: PCT/EP97/02350

§ 371 Date: Jan. 14, 1998

§ 102(e) Date: Jan. 14, 1998

[87] PCT Pub. No.: WO97/43565

PCT Pub. Date: Nov. 20, 1997

[30] Foreign Application Priority Data

May 15, 1996 [DE] Germany .......................... 196 19 809

[51] Int. Cl.$^6$ .................................................. F16H 27/04
[52] U.S. Cl. .......................... 74/84 R; 74/812 R; 74/820
[58] Field of Search ................................ 74/812 R, 820, 74/817, 84 R

[56] References Cited

U.S. PATENT DOCUMENTS

| | | |
|---|---|---|
| 2,986,949 | 6/1961 | Lancaster et al. . |
| 3,590,661 | 7/1971 | Chaveneaud et al. . |
| 4,109,548 | 8/1978 | Shinohara et al. ................... 74/84 R X |
| 4,416,165 | 11/1983 | Kramer et al. ......................... 74/820 X |
| 4,860,414 | 8/1989 | Bishop et al. ......................... 74/818 X |
| 5,386,743 | 2/1995 | Su et al. ............................. 74/813 R X |
| 5,598,749 | 2/1997 | Goto ................................... 74/813 R X |

FOREIGN PATENT DOCUMENTS

| | | |
|---|---|---|
| 1941214 | 1/1972 | Germany . |
| 2218755 | 10/1973 | Germany . |
| 1625023 | 6/1974 | Germany . |
| 2903732 | 4/1980 | Germany . |
| 1260928 | 1/1972 | United Kingdom . |
| 1351082 | 4/1974 | United Kingdom . |
| 2041148 | 9/1980 | United Kingdom . |
| 2071805 | 9/1981 | United Kingdom . |

Primary Examiner—Dirk Wright
Assistant Examiner—Peter T. Kwon
Attorney, Agent, or Firm—Webb Ziesenheim Logsdon Orkin & Hanson, P.C.

[57] ABSTRACT

The stepping gear mechanism is provided in particular for motion control of a machine tool turret and comprises two cam plates adapted to be driven in rotation in the same sense about an axis of rotation each and arranged in such manner with respect to a roller supporting member that circular stop zones of both cam plates each engage a roller at the same time and in mutually counteracting fashion, whereby the roller supporting member is prevented from rotating. Subsequently, a projection of a cam plate engages one roller, while another roller dips into an indentation of the other cam plate so that the roller supporting member will be rotated. The cam plates are disposed adjacent each other and their projections are movable past each other in overlapping relationship such that, alternating with these conditions of engagement, the stop zones of both cam plates engage one and the same roller simultaneously and opposingly, whereby the roller supporting member once again is prevented from rotating. Thereafter, the projection of a cam plate engages a roller, while the very same roller dips into the indentation of the other cam plate so that the roller supporting member is rotated again. As a result, the number of indexing positions at which the turret is arrested during each revolution is twice as great as the number of rollers mounted on the roller supporting member.

12 Claims, 10 Drawing Sheets

Fig. 2f

STEPPING GEAR MECHANISM

BACKGROUND OF THE INVENTION

Field of the Invention

The invention relates to a stepping gear mechanism such as for motion control of a machine tool turret.

BACKGROUND INFORMATION

In a known stepping gear mechanism such as disclosed in GB 1 260 928 a roller supporting member cooperates with two cam plates which are identical as such but arranged in inverse relationship. Each of them includes a stop zone which is concentric with the axis of rotation of the cam plate and extends continuously through approximately 250° and further includes a motion zone formed at a projection and an indentation, each extending through approximately 55°. A first one of these two cam plates has the stop zone followed first by the projection with the motion zone and then the indentation; and vice versa for the second cam plate. When a common drive wheel causes both cam plates to rotate in the same direction through 360°, first the projection of the first cam plate will entrain a first roller of the roller supporting member, while the next roller, the second one, is not touched by a cam plate, the third roller dips into the indentation of the second cam plate, and the fourth roller likewise is not touched by a cam plate. As soon as the third roller has reached the end of the indentation of the second cam plate it will be taken along by the projection, while the first roller is released by the first cam plate and the indentation thereof receives the second roller. Finally, the third roller is released by the second cam plate, and the second and fourth rollers engage a stop zone each of the cam plates so that the roller supporting member having accomplished a quarter of a revolution is prevented from rotating any further until the two cam plates have executed a full revolution.

With this known stepping gear mechanism, therefore, the number of indexing positions which a turret or like element connected to the roller supporting member may occupy is the same as the number of rollers mounted on the roller supporting member. As a consequence, a roller supporting member of given diameter can mount only relatively small rollers for no more than four indexing positions. That applies even more where six or more indexing positions are needed and, therefore, a corresponding elevated number of rollers must be provided. Due to their restricted dimensions, the rollers cannot be loaded by particularly strong forces, such as required in order to securely hold the roller supporting member against the influence of a great external torque. External torques of significant magnitude occur, for example, when the stepping gear mechanism is provided to drive a turret of an automatic lathe in which the turret is prevented from rotating, in each of its indexing positions, by the stepping gear mechanism alone and is not locked by any additional device.

SUMMARY OF THE INVENTION

It is the object of the invention to develop a stepping gear mechanism, suitable especially for motion control of turrets in turning machines, such that it will be able to reliably withstand great torques acting from outside on the roller supporting member, at given dimensions of the cam plates and of the roller supporting member.

The object is met, in accordance with the invention, by the features of the present invention. Advantageous further developments may be gathered from the following description.

By virtue of the invention, the number of rollers required on the roller supporting member need only be half as great as the number of indexing positions at which the roller supporting member—and thus a turret or the like connected to the same—is stopped in the course of each full revolution. For this reason each individual roller may have a rather great diameter and be loaded by equally strong forces.

BRIEF DESCRIPTION OF THE DRAWINGS

An embodiment of the invention will be described in greater detail below, with reference to diagrammatic drawings, in which:

FIG. 3 is the sectional elevation III—III of FIG. 2a;

DESCRIPTION OF THE PREFERRED EMBODIMENT

The drawings illustrate a stepping gear mechanism 10 to drive a turret 12 which carries tools and has six indexing positions and, therefore, is provided with six tool holders 14, one each for a turning tool 16 or one or more drill bits 18 or any other machining tool.

Figure 1:
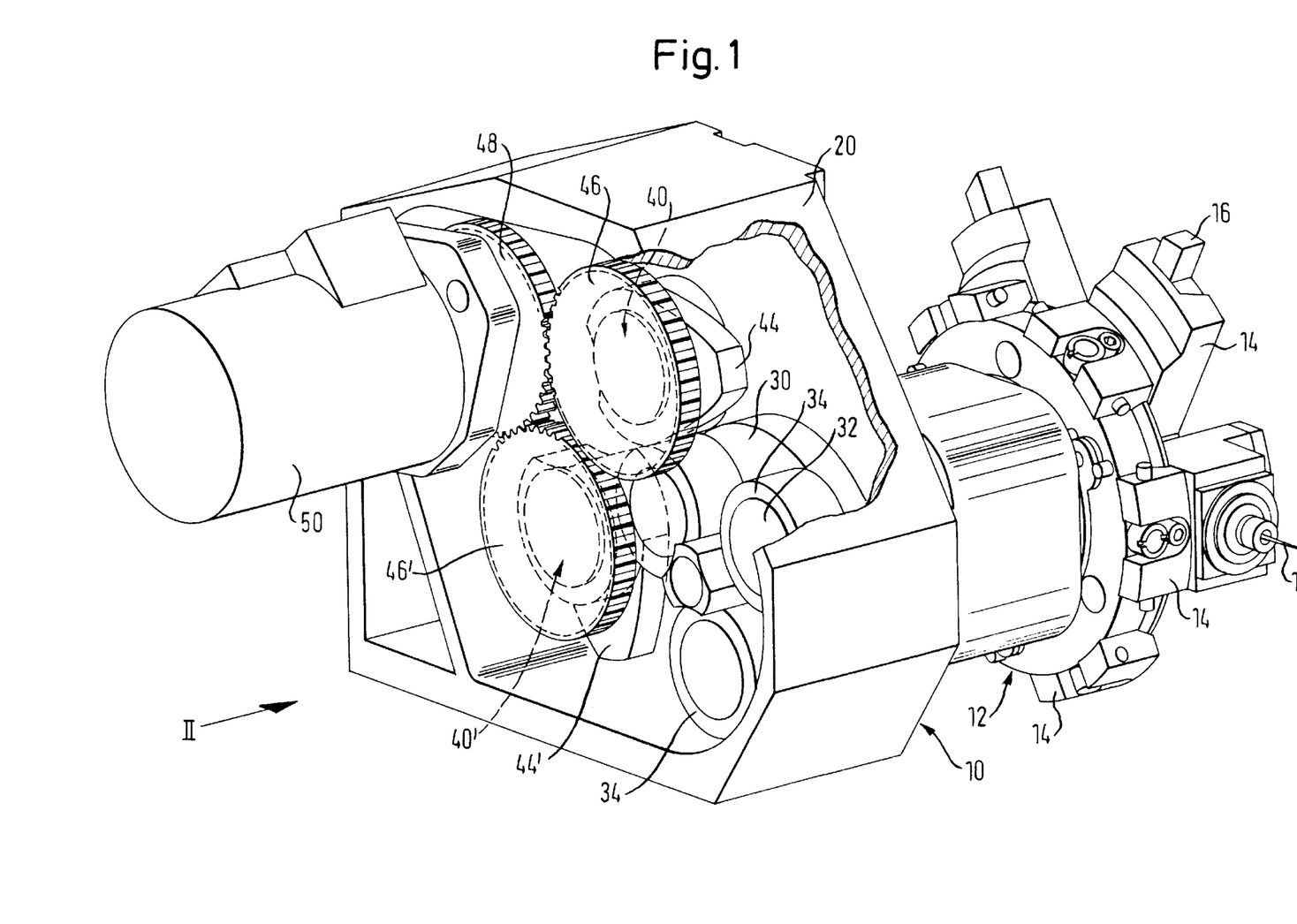
FIG. 1 is a perspective view of a stepping gear mechanism, showing the casing open and partly broken away.
Figure 3:
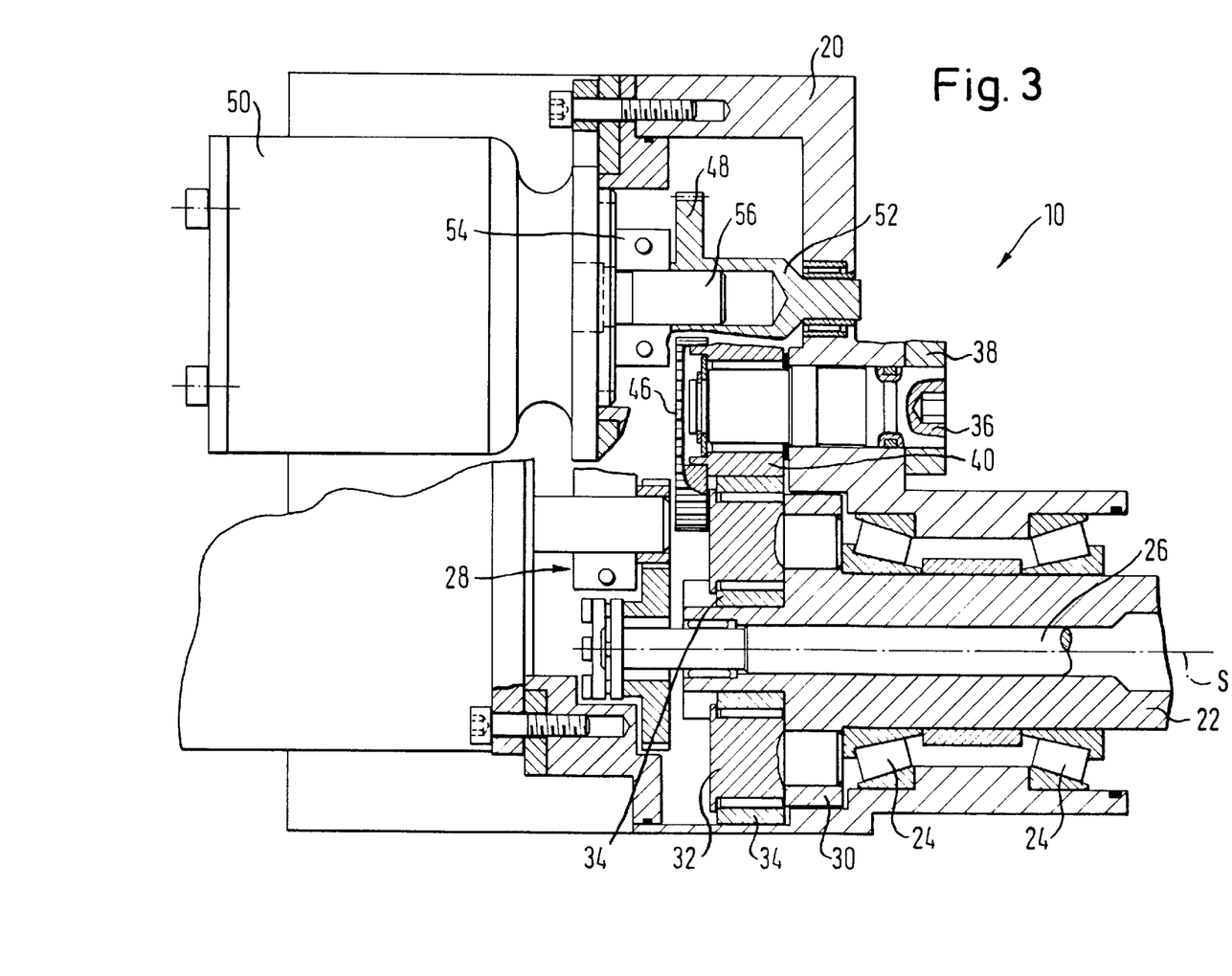
Figure 4:
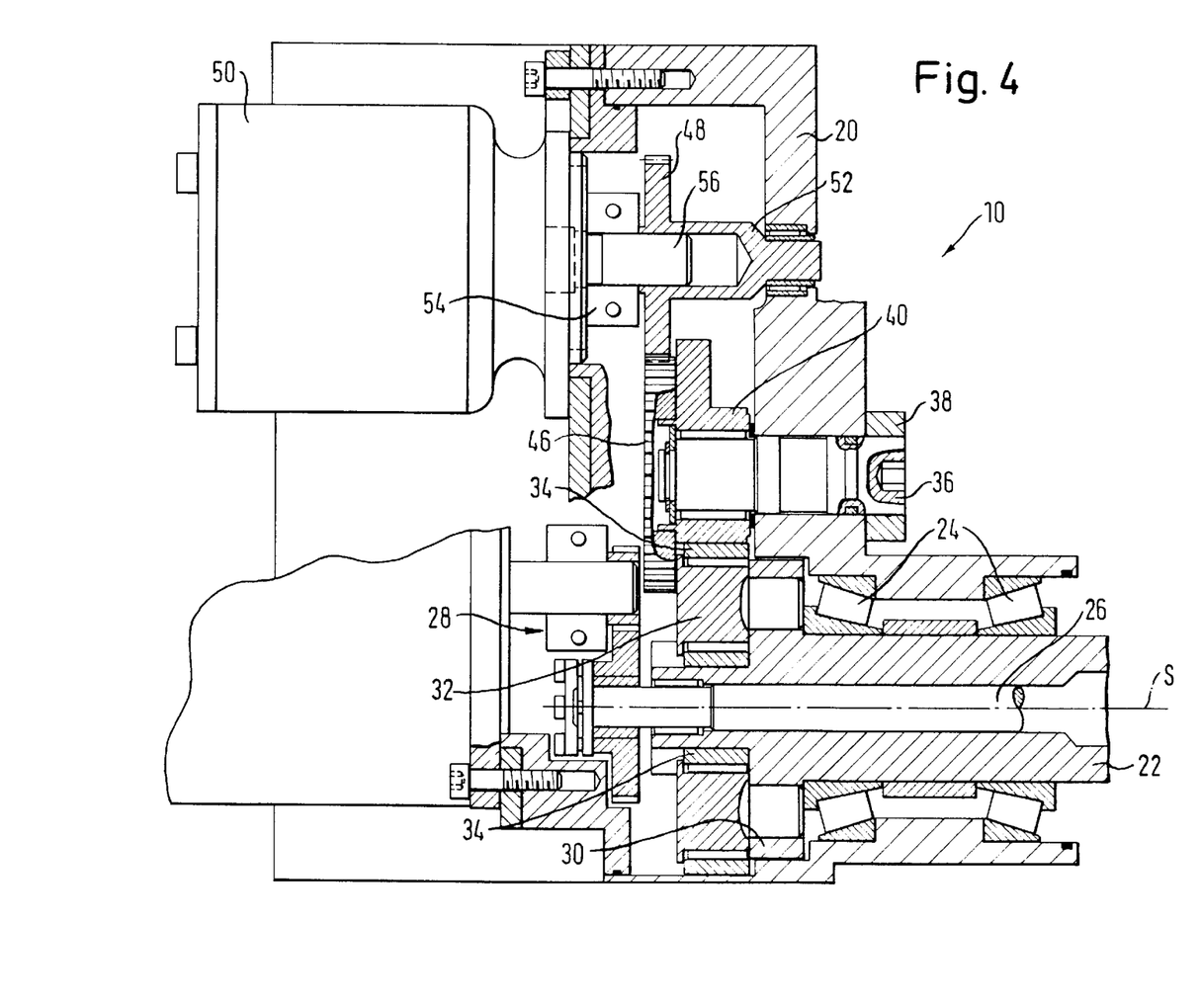
FIG. 4 is the sectional elevation IV—IV of FIG. 2d.

The stepping gear mechanism 10 comprises a casing 20 which may be fixed, for instance, on a top slide of a cross slide system. A control shaft 22 is supported in the casing 20 by means of conical roller bearings 24 so as to be rotatable about a shift axis S. The control shaft 22 carries the tool turret 12 and is embodied by a hollow shaft which supports a drive shaft 26 for tools adapted to be driven in rotation, such as the drill bit 18 shown in FIG. 1. The drive shaft 26 is adapted to be driven in conventional manner by a motor (not shown) acting through a reduction gear 28. The left hand end portion, as seen in FIGS. 1, 3, and 4 of the control shaft 22 is designed as roller supporting member 30 and comprises three pivots 32 disposed at equal angular spacings of 120° around the shift axis S. Each of the three pivots 32 supports a roller 34 for rotation about a roller axis R extending parallel to the shift axis S. The three rollers 34 are spaced equally from the shift axis S and lie in a line, i.e. they are interchangeable by rotation of the control shaft 22.

Two axle journals 36 and 36', slightly eccentrical, are supported in the casing 20 at equal spacings from the shift axis S and at approximtely the same spacing from each other. They are adapted to be clamped in a desired angular position by means of a clamping plate 38 each. Each of the two axle journals 36 and 36' supports a cam plate 40 and 40', respectively, for rotation about an axis of rotation K and K', respectively, extending parallel to the shift axis S and the roller axis R. The precise position of the axes of rotation K and K' is adjustable by rotating the corresponding eccentrical axle journal 36 or 36' and may then be fixed by securing the associated clamping plate 38. Each of the two cam plates 40 and 40' has a substantially circular core 42 and 42', respectively, having the same width, measured in axial direction, as the rollers 34 and further a projection 44 and 44', respectively, which protrudes radially outwardly and is half as wide.

Figure 5:
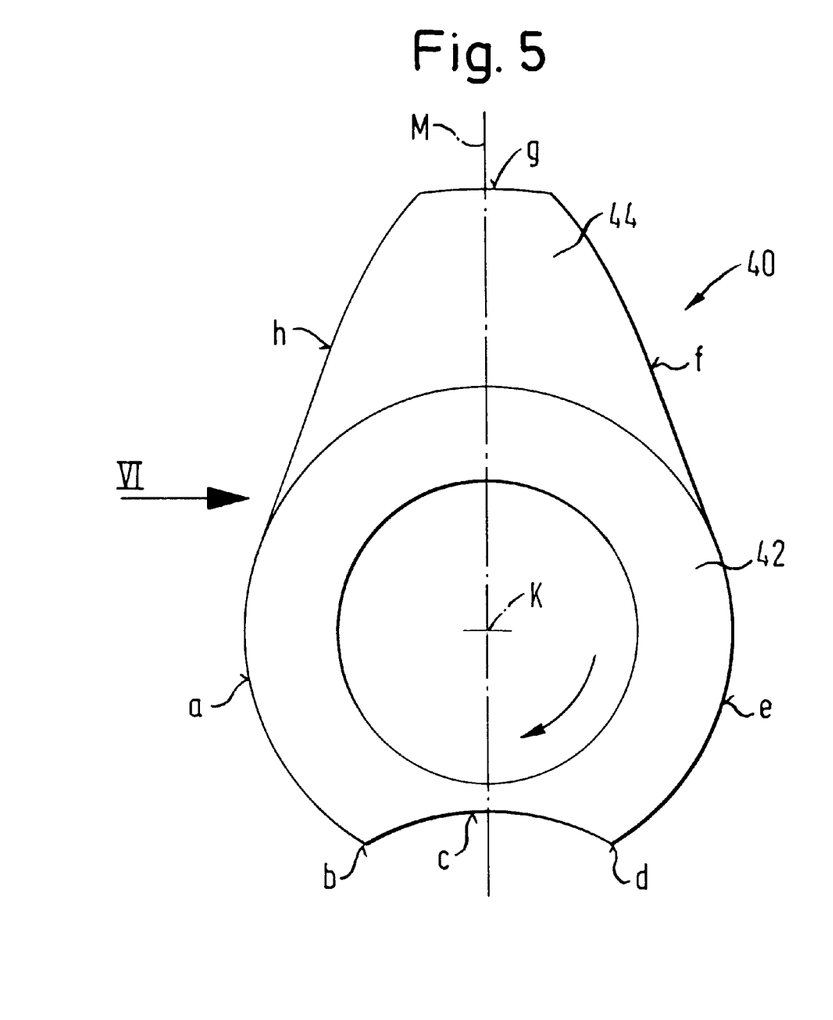
FIG. 5 is a plan view of a cam plate.
Figure 6:
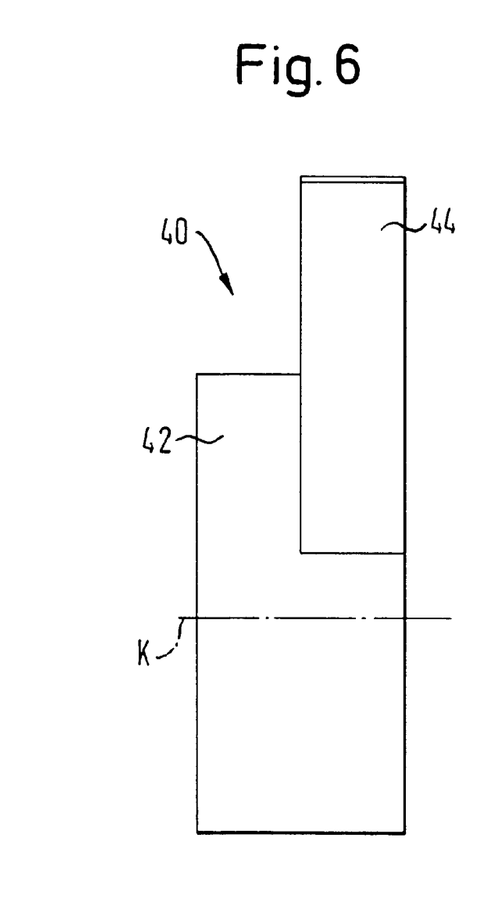
FIG. 6 is a side view in the direction of arrow VI of FIG. 5.

FIGS. 5 and 6 show the cam plate 40 in greater detail. It is symmetrical with respect to the center plane M. Its core 42 has a leading or front stop portion a upon rotation in the direction of the arrow. This portion is of exact circular cylindrical configuration, having the axis of rotation K as the axis of curvature. The stop portion a ends at a location b whence the core 42 has a gradually diminishing distance from the axis of rotation K so that it is there that a central indentation c begins. In accordance with the symmetry in respect of the center plane M, the distance from the axis of rotation K begins to increase gradually again up to a location d which then is followed by another circular cylindrical stop portion e. Next is the projection 44, with a motion zone which begins by a steep front flank f, continues by a circular cylindrical portion g, and ends by a steep rear flank h.

Cam plate 40' is absolutely identical with cam plate 40. However, it is slipped onto its axle journal 36' in such a way that its projection 44' is located at the left in FIGS. 1, 4, and 5, whereas the projection 44 of the cam plate 40 is positioned at the right. As a result, the projections 44 and 44' are movable past each other in overlapping relationship although the two cam plates 40 and 40' as a whole are not axially offset with respect to each other.

Each of the two cam plates 40 and 40' is connected for joint rotation to an intermediate wheel 46 and 46' concentric with the respective axis of rotation K and K'. The two intermediate wheels 46 and 46' are of the same size and embodied by spur gears in the embodiment shown. They are meshing with a drive gear 48 of the same size whose axis lies in an angle bisector plane W which includes the shift axis S and is located at equal distances from both axes of rotation K and K' of the cam plates 40 and 40'. The drive wheel 48 is driven by a drive means 50, such as an oil engine. In the embodiment shown, this is accomplished by having the drive wheel 48 formed integral with a hollow shaft 52 which is connected by a clamping device 54 in torque transmitting relation to the shaft 56 of the drive means 50.

The stepping gear mechanism 10 functions to rotate the roller supporting member 30 and, together with it, the tool turret 12 in steps of 60° each. During phases of standstill it stops and retains the same so reliably and precisely that no additional locking of the tool turret 12 is required although considerable torques must be expected to act on the tool turret 12 and thus also on the roller supporting member 30 when certain tools are used, for example the turning tool 16 shown.

Figure 2A:
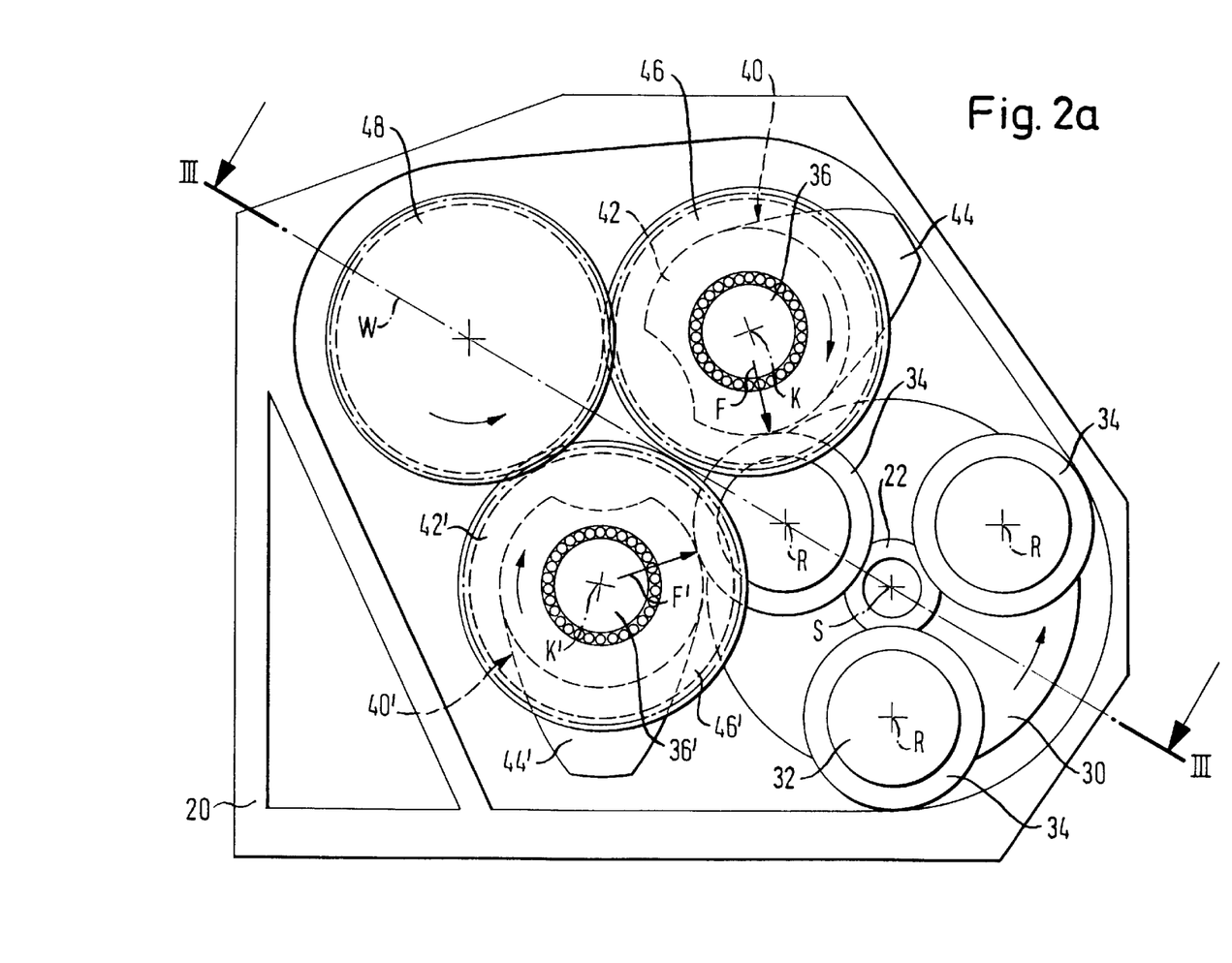
FIG. 2a is the axial view in the direction of arrow II of FIG. 1, during a first phase of standstill of the gear.

FIGS. 2a to 2f illustrate the sequence of motions of the stepping gear mechanism 10 during one step:

As shown in FIG. 2a, both cam plates 40 and 40' engage the same roller 34 by a circular cylindrical stop portion a and e, respectively, of their respective core 42 and 42', and they each exert a force F and F', respectively, on the same. The line of application of that force is at a considerable distance from the shift axis S. Therefore, relatively small forces F and F' are sufficient for applying opposed torques to the roller supporting member 30 that suffice for positively preventing the tool turret 12 from rotating, no matter what the loading may be. The roller 34 in question is in a position at which its roller axis R lies in the angle bisector plane W. Now the drive means 50 is switched on so that both cam plates 40 and 40' will be rotated by the drive wheel 48 in the same sense, as indicated by the arrows in the drawing. The roller supporting member 30 at first remains in its position.

Figure 2B:
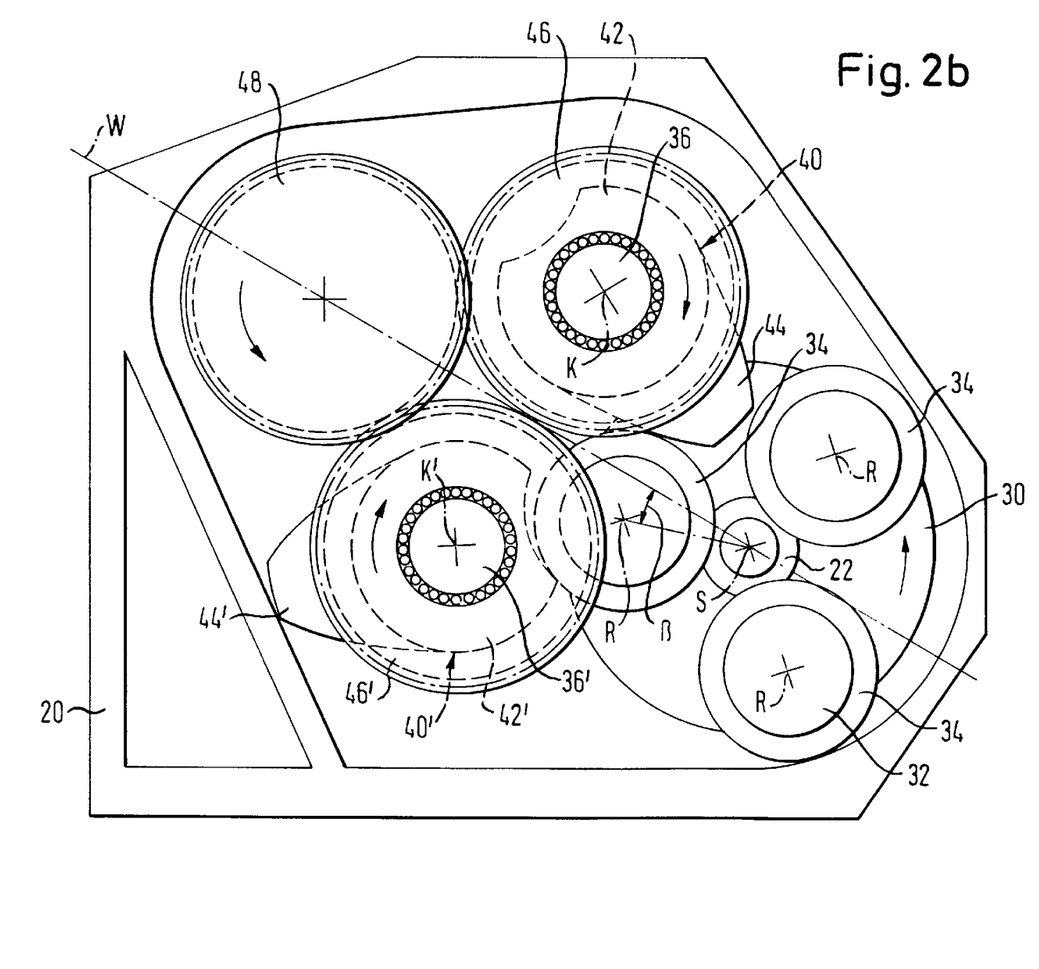
FIG. 2b is the corresponding view during a first phase of acceleration.

In FIG. 2b, both cams 40 and 40' have reached positions at which they have begun to accelerate the roller supporting member 30 in the direction of the arrow. By the steep front flank f of its projection 44, the cam plate 40 acts on the roller 34 mentioned, while the indentation c formed in the core 42' of the cam plate 40' offers space for the same roller 34, at the same time, preventing it from moving away from the cam plate 40. The roller 34 in question, therefore, still stays in form lock between the two cam plates 40 and 40', whereas the roller supporting member 30 has turned through angle β out of its starting position.

Figure 2C:
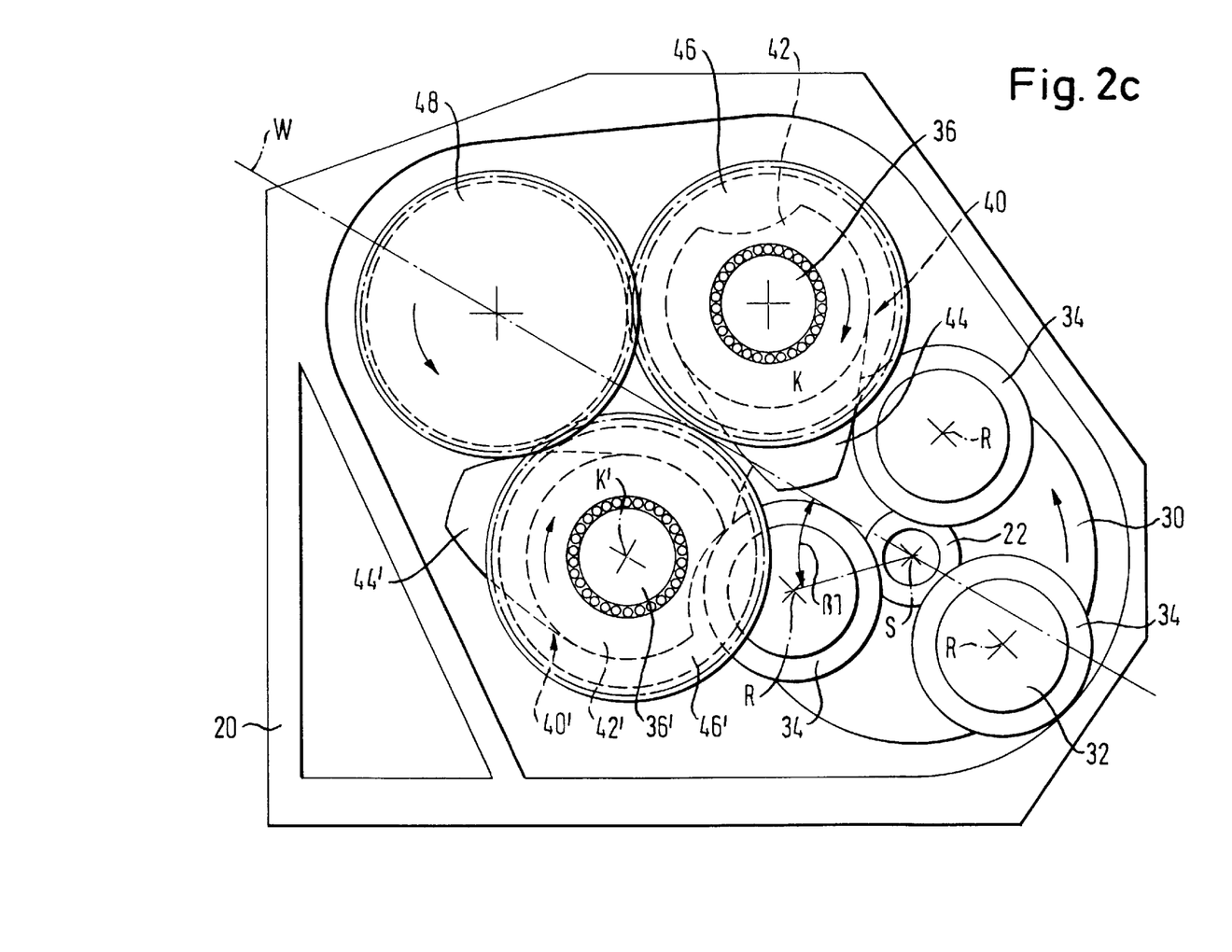
FIG. 2c is the corresponding view during a first phase of deceleration.

As shown in 2c, the roller 34 in question now continues to be contacted by the cam plate 40' alone, more specifically by the core 42' thereof, since the roller supporting member 30 has rotated through angle β1 away from its initial position. By the steep rear flank h of its projection 44, the cam plate 40 engages the next successive roller 34, now being the top roller, and slows down the rotational movement of the roller supporting member 30 and thus of the tool turret 12. This engagement between the projection 44 and the top roller 34, as seen in FIG. 2c, was initiated before the preceding roller 34, now located at the left lower side, lost contact with the projection 44. The roller supporting member 30 thus is guided constantly in form lock engagement by both cam plates 40 and 40' so that it cannot rotate in uncontrolled fashion, even during the deceleration phase.

Figure 2D:
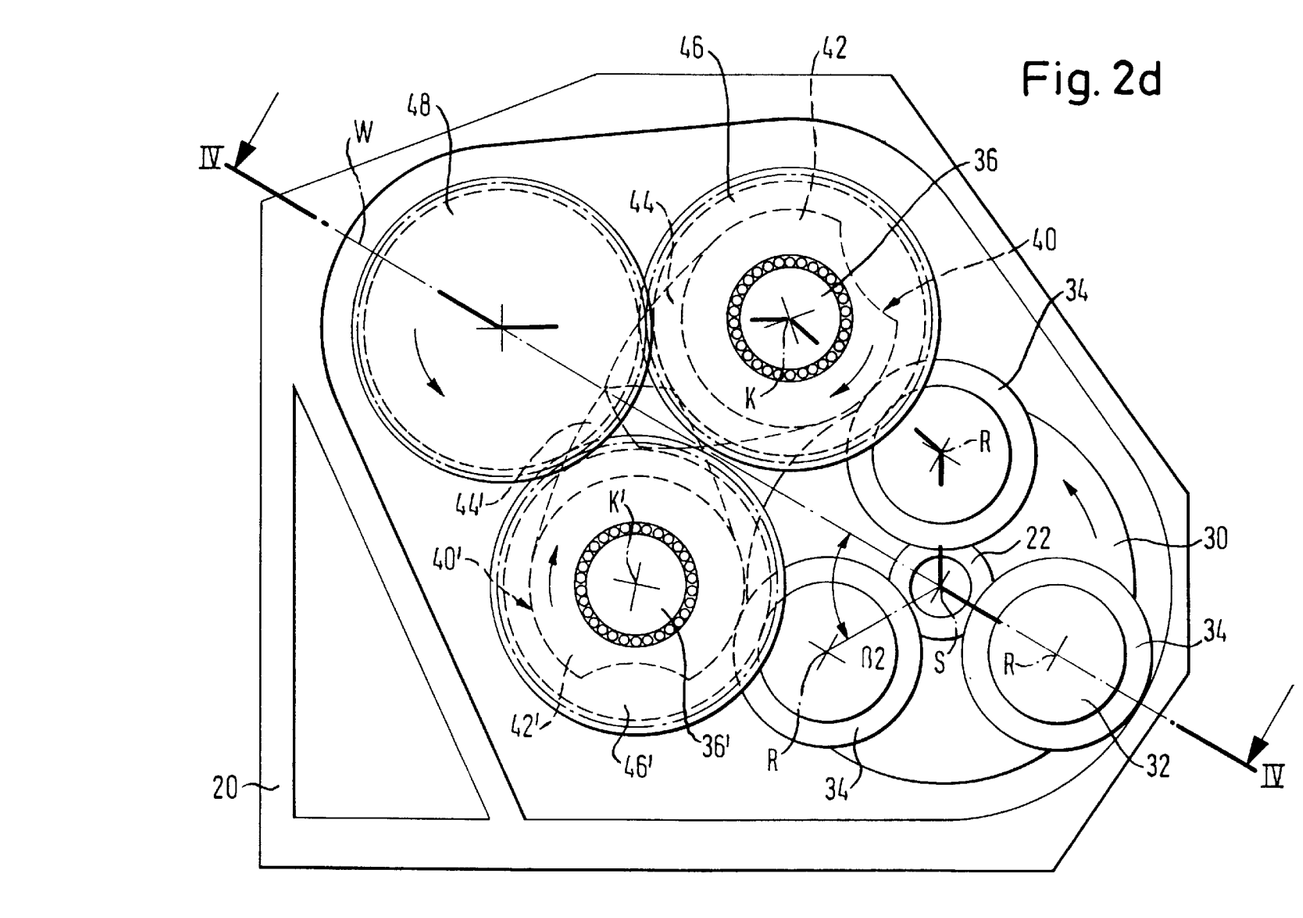
FIG. 2d is the corresponding view during a second phase of standstill.

In FIG. 2d, the next phase of standstill has been reached since the roller supporting member 30 has made a turn through 60°, i.e. half the angular spacing β2 between two adjacent rollers 34. In the meantime, the two cam plates 40 and 40' each have rotated through 180° as compared to the first phase of standstill presented in FIG. 2a. Once again a roller axis R, this time the one which is farthest away from the cam plates 40 and 40' lies in the angle bisector plane W. According to FIG. 2d the two cam plates 40 and 40' still act on the same two rollers 34 as in FIG. 2c; again this action is effected by circular cylindrical stop portions a and e, respectively, of the cores 42 and 42' so that the roller supporting member 30 is held fixed against rotation even though the cam plates 40 and 40' continue to revolve.

Figure 2E:
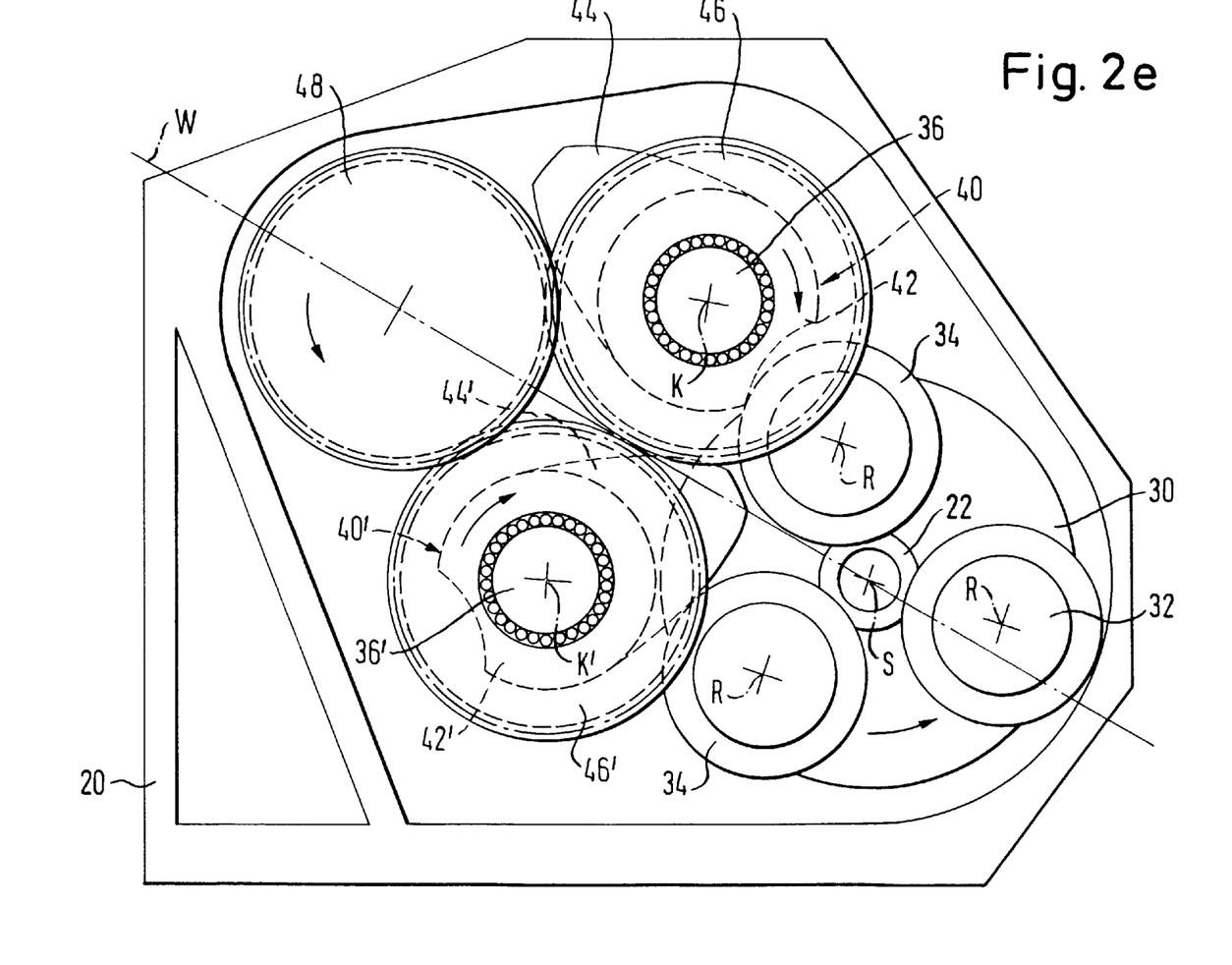
FIG. 2e is the corresponding view during a second phase of acceleration.

The next indexing step begins when the two cam plates 40 and 40' have rotated a little bit beyond the position illustrated in FIG. 2d. At that time, the contact between the cam plate 40 and the upper roller 34, as seen in FIG. 2d, gradually shifts into the indentation c formed in the core 42 thereof, while the cam plate 40' acts by the front flank f of its projection 44' on the roller 34 in the left lower position, as seen in FIG. 2d. Hereby the roller supporting member 30 and thus the tool turret 12 at first are accelerated once more in the original direction of rotation, as seen in FIG. 2e, in order then to be decelerated again, according to FIG. 2f. Via the positioning as illustrated in FIGS. 2e and 2f, the stepping gear mechanism in this manner ultimately arrives once again at the starting position of FIG. 2a.

The position shown in FIG. 2a thus is reached again when the roller supporting member 30 and thus the tool turret 12 have rotated through 120°, in other words, after two indexing steps. During this time, the two cam plates 40 and 40' each have terminated one full revolution, starting from the original position shown in FIG. 2a.

Figure 2F:
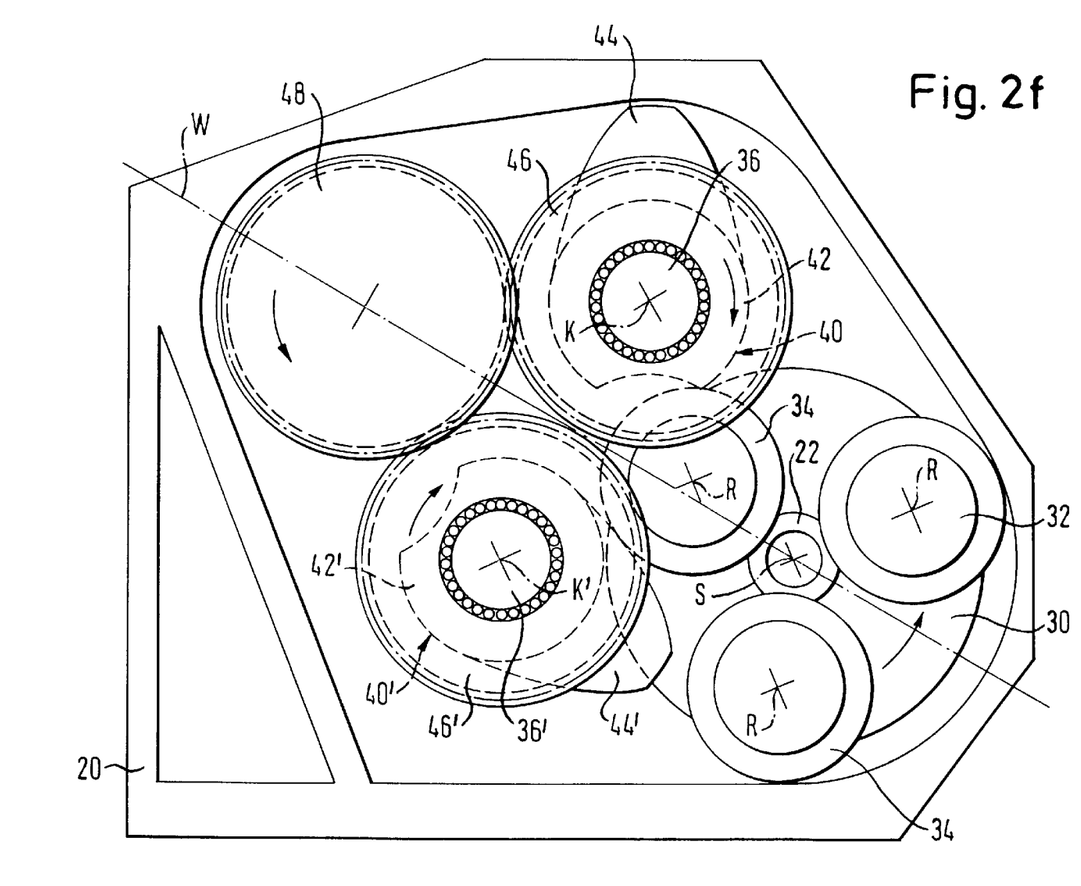
FIG. 2f is the corresponding view during a second phase of deceleration.

During each full turn of the two cam plates 40 and 40', their projections 44 and 44' move past each other once in the manner which may be gathered from FIGS. 2e and 2f. That is accomplished without collision and without any offset in axial direction of the two cam plates 40 and 40' as such by the fact that the width of the two cam plates 40 and 40', measured in axial direction at their projections 44 and 44', is reduced to slightly less than one half, as compared to the cores 42 and 42' and that the two projections 44 and 44' are disposed axially offset accordingly. In spite of the fact that the rather narrow projections 44 and 44' are responsible for the acceleration and deceleration of the roller supporting member 30 and of the entire inert mass of the tool turret 12, including the tool holders 14 plus tools 16 and 18 mounted on the same, admissible pressures per unit area are not exceeded in the action of the projections 44 and 44' on the rollers 34. It is essential that the cores 42 and 42' are at least approximately of the same width in axial direction as the rollers 34 and also cooperate with them substantially over their entire width. After all, the greatest forces occurring are those needed for holding the tool turret 12 firmly in position, and these are transmitted exclusively from the cores 42 and 42' to the respective one of the rollers 34 (FIG. 2a) or to two adjacent rollers 34 (FIG. 2d).

The roller diameters may be selected to be relatively large because no more than three rollers 34 are needed for six indexing steps of the roller supporting member 30. Consequently, the pressures per unit area can be kept low even when strong forces come to act.

What is claimed is:

1. A stepping gear mechanism comprising:

a roller supporting member which is rotatable about a shift axis and supports angularly spaced rollers for rotary movement in such a manner that their positions are interchangeable by rotation of the roller supporting member;

two cam plates each supported for rotary movement about an axis of rotation of their own and so as to be driven in rotation in the same sense, and each being composed of a core including a stop zone which is concentric with the axis of rotation of the respective cam plate and an indentation, and a projection including a motion zone, wherein the cam plates are arranged with respect to the roller supporting member such that the stop zones of both cam plates are adapted to enter into simultaneous and counteracting engagement with a roller, whereby the roller supporting member is prevented from rotating forwardly and backwardly, and the motion zone of each one of the cam plates is adapted to enter into engagement with one of the rollers while another one of the rollers dips into the indentation of the other cam plate so that the roller supporting member is rotated, and wherein the cam plates are disposed adjacent each other in such manner that their projections are movable past each other in overlapping relationship wherein the stop zones of both cam plates are adapted to engage one and the same roller simultaneously and opposingly, whereby the roller supporting member is prevented from rotating forwardly and backwardly, and the motion zone of each one of the cam plates is adapted to engage one of the rollers while the same roller dips into the indentation of the other cam plate so that the roller supporting member is rotated.

2. The stepping gear mechanism as claimed in claim 1, wherein only the core of each of the cam plates conforms approximately with the rollers in its axial width and position, while the projections each are approximately half as wide in axial direction and mutually offset in an axial direction.

3. The stepping gear mechanism as claimed in claim 2, wherein each of the cam plates is symmetrical with respect to an axial center plane, its stop zone being divided into a front stop portion and a rear stop portion, the portions being interconnected by the indentation and by the motion zone.

4. The stepping gear mechanism as claimed in claim 3, wherein the two cam plates are identical and their axes of rotation are located at identical distances from the shift axis.

5. The stepping gear mechanism as claimed in claim 4, wherein the axis of rotation of the two cam plates each are defined by an eccentrically supported, rotatably adjustable axle journal.

6. The stepping gear mechanism as claimed in claim 2, wherein the axes of rotation of the two cam plates each are defined by an eccentrically supported, rotatably adjustable axle journal.

7. The stepping gear mechanism as claimed in claim 3, wherein the axes of rotation of the two cam plates each are defined by an eccentrically supported, rotatably adjustable axle journal.

8. The stepping gear mechanism as claimed in claim 1, wherein each of the cam plates is symmetrical with respect to an axial center plane, its stop zone being divided into a front stop portion and a rear stop portion, the portions being interconnected by the indentation and by the motion zone.

9. The stepping gear mechanism as claimed in claim 8, wherein the two cam plates are identical and their axes of rotation are located at identical distances from the shift axis.

10. The stepping gear mechanism as claimed in claim 9, wherein the axes of rotation of the two cam plates each are defined by an eccentrically supported, rotatably adjustable axle journal.

11. The stepping gear mechanism as claimed in claim 8, wherein the axes of rotation of the two cam plates each are defined by an eccentrically supported, rotatably adjustable axle journal.

12. The stepping gear mechanism as claimed in claim 1, wherein the axes of rotation of the two cam plates each are defined by an eccentrically supported, rotatably adjustable axle journal.

* * * * *